United States Patent [19]

Cornell

[11] 4,178,698
[45] Dec. 18, 1979

[54] TEACHING SYSTEM

[76] Inventor: William D. Cornell, 907 Camargo Dr., Ballwin, Mo. 63011

[21] Appl. No.: 837,377

[22] Filed: Sep. 28, 1977

[51] Int. Cl.² .............................................. G09B 5/06
[52] U.S. Cl. ........................................ 35/8 A; 35/36; 360/29
[58] Field of Search .................. 35/8 R, 8 A, 36; 360/29

[56] References Cited

U.S. PATENT DOCUMENTS

| | | | |
|---|---|---|---|
| 3,418,433 | 12/1968 | Hodge | 360/29 |
| 3,425,140 | 2/1969 | Dillon et al. | 35/36 |
| 3,838,211 | 9/1974 | Joannov | 35/36 X |
| 3,886,670 | 6/1975 | Lucien et al. | 35/36 X |
| 3,924,339 | 12/1975 | Wilson et al. | 35/36 X |
| 3,942,268 | 3/1976 | Wilson | 35/36 X |
| 4,112,597 | 9/1978 | Seaver | 35/36 |

OTHER PUBLICATIONS

*Modern Instrumentation Tape Recording* ©1978, pp. 1,3,35,36.

*Primary Examiner*—William H. Grieb

[57] ABSTRACT

An economical, practical method of bringing the major portion of a classroom teaching experience to a remote student. The teacher's oral and blackboard presentations are recorded, forwarded to the student and played back on equipment that reproduces the teacher's voice and his or her graphics that would normally be presented on a blackboard, retaining the time correlation between the spoken and written texts.

17 Claims, 22 Drawing Figures

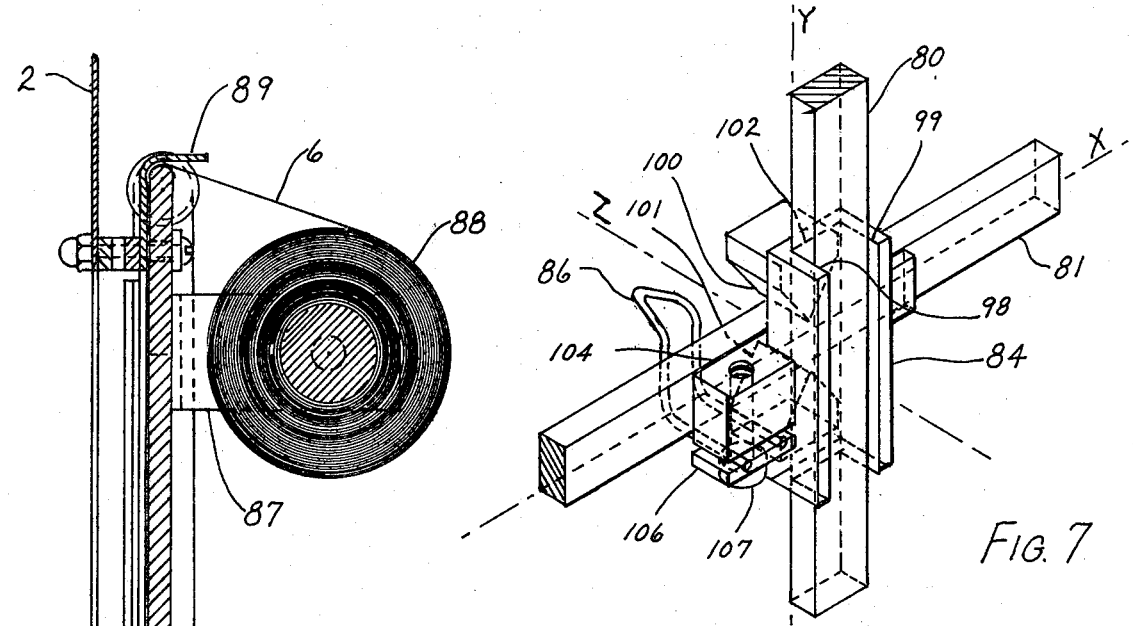
FIG. 7
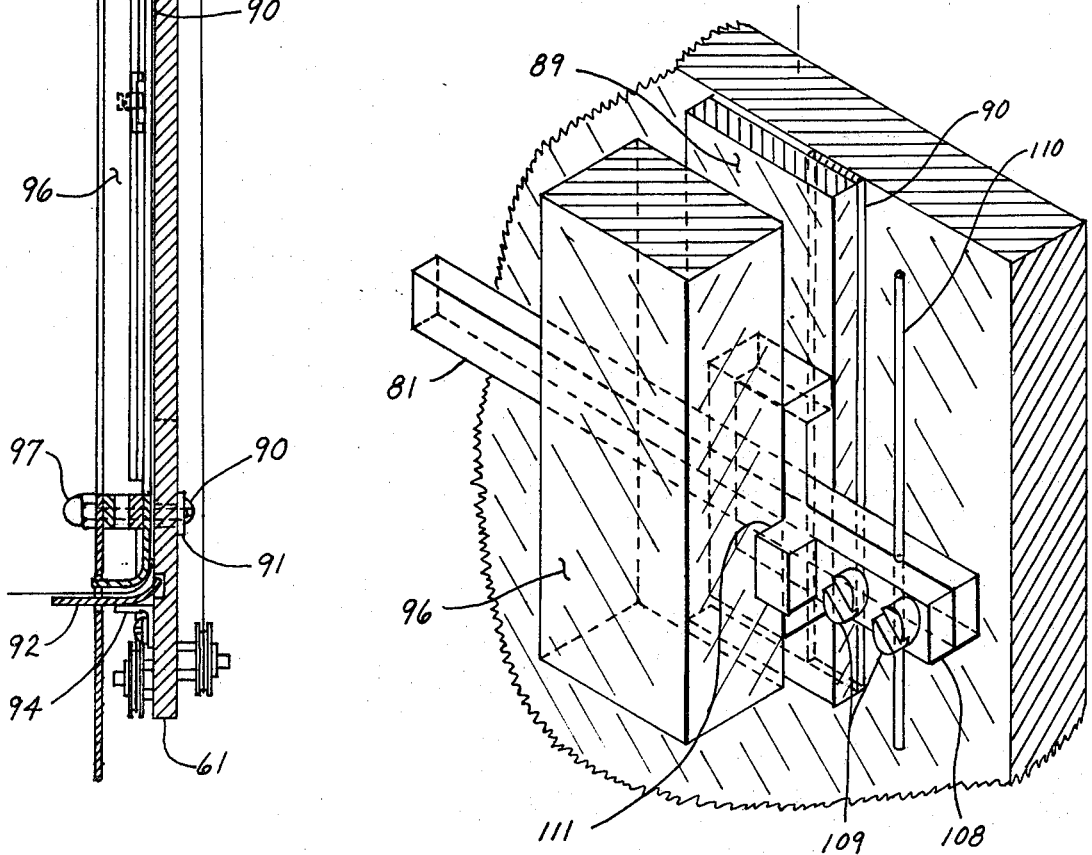
FIG. 6
FIG. 8

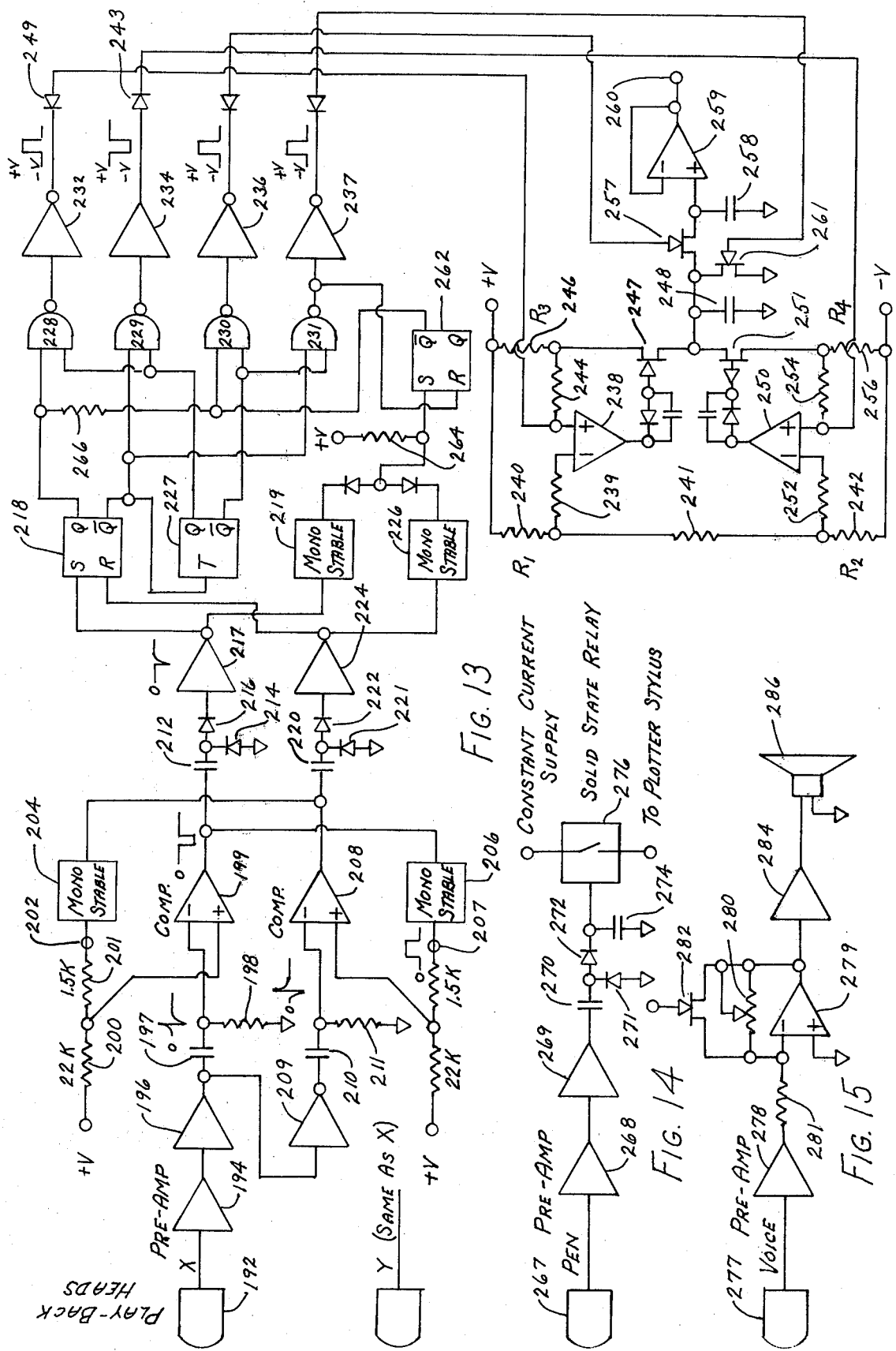

OPERATIONAL MODES: 1 RECORD
2 PLAYBACK
3 EDIT AUDIO
4 EDIT WRITING

MODES WHEN
ACTIVE                    RECORD CIRCUITS
1 & 3        PEN POSITION X COORDINATE GENERATION, CODING AND RECORD CIRCUITS
1 & 3        PEN POSITION Y COORDINATE GENERATION, CODING AND RECORD CIRCUITS
1 & 3        PEN UP-DOWN, TONE SIGNAL GENERATION AND RECORD CIRCUITS
1 & 4        VOICE AMPLIFICATION AND RECORD CIRCUITS

1 & 3 & 4    BIAS & ERASE OSCILLATOR RELAY
1 & 3        PEN (TONE) BIAS CONTROL, REED RELAY
1 & 4        VOICE BIAS CONTROL, REED RELAY
                          PLAYBACK CIRCUITS
1 & 2 & 3 & 4    PEN POSITION X COORDINATE
1 & 2 & 3 & 4    PEN POSITION Y COORDINATE
1 & 2 & 3 & 4    PEN UP-DOWN (STYLUS POWER SWITCHING)
2 & 3 *          VOICE (*USE MODES 1 & 4 TO DISABLE AUDIO PLAYBACK)

1 & 2 & 3 & 4    X & Y SERVO AMPLIFIERS
1 & 2 & 3 & 4    STYLUS POWER SUPPLY

NECESSARY COMBINATIONS = (1 & 3), (1 & 4), (1 & 3 & 4) AND CONTINUOUS

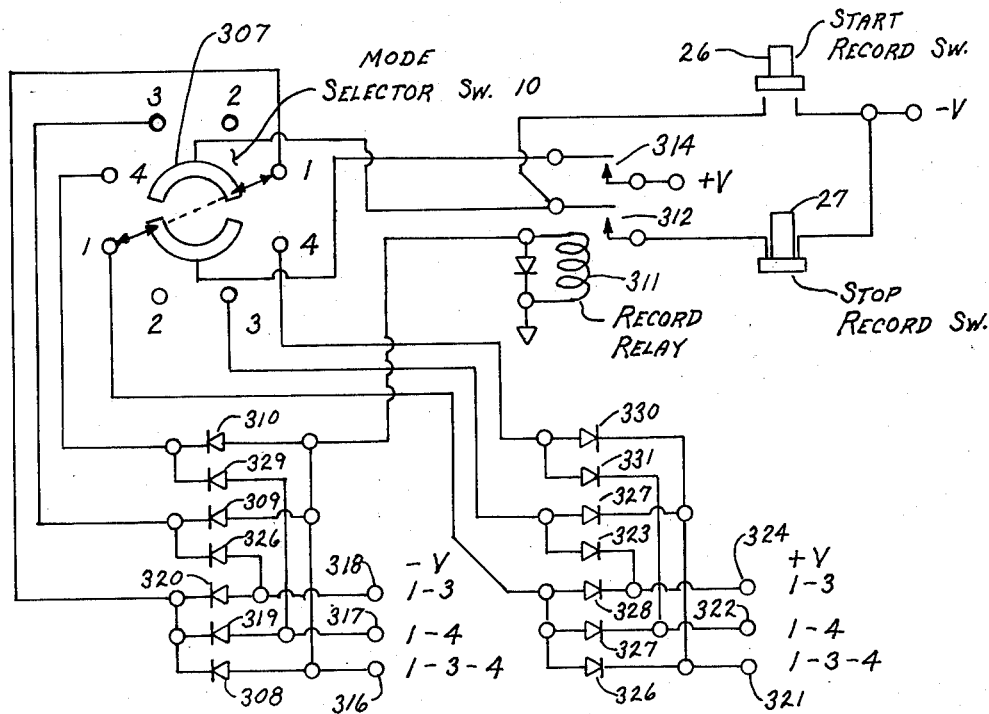

FIG. 22

TEACHING SYSTEM

PRIOR ART

U.S. Pat. No. 3,418,433.

BACKGROUND OF THE INVENTION

This invention is directed to the end of bringing to the individual student at his time and place of convenience the same classroom presentation that typically occupies the majority of the classroom time. And to accomplish this with equipment within the price reach of most students.

One means of fulfillment of this need has been via broadcast of live or video recorded Educational TV. Most students have access to the necessary equipment to receive such broadcasts. The draw-backs are that are limited number of courses are available at any one time, the geographic coverage is limited, scheduling as to time of day or day of week is not always convenient and if a student becomes confused on a concept he cannot resolve his problem by asking for clarification or by halting the presentation until he can clarify the concept by other references such as a text book.

Another means of fulfilling this need has been by use of movies. The per student cost for playback equipment is reasonable, however, the cost of preparation is high and also the cost of copies on a per use basis is high.

Another means has been use of audio tapes in conjunction with slides and workbooks. The cost of this equipment on a per student basis is reasonable. The problem with this approach is that the graphics are not in concurrence with the audio text, unless an excessive number of progressively completed graphics are provided. Otherwise the reference between the two presentations is tenuous.

Conversely, unambiguous reference between the oral and written texts accounts for the long and continued use of blackboards, and more recently the use of overhead projectors.

It is very desirable to develop the graphics in concurrence with the audio text. TV can do it and movies can do it, but neither can do it in an acceptable manner for reasons previously detailed.

DESCRIPTION OF PRIOR ART

The frequency bandwidth of audio, magnetic tape and home quality tape decks is sufficient to record and playback not only the audio text but also the written text. The Victor Company apparently recognized this when they endeavored to interpose a tape recorder/player between two of their Telautograph type units. This attempt was not successful, however, for two reasons. First, they utilized frequency modulation with a consumer quality tape recorder/player and endeavored to compensate for speed variations (wow and flutter) by recording a fixed frequency tone, then using the variation of this tone's frequency during playback to compensate the distorted frequency modulation encoding of the pen position information. This compensation was not sufficiently effective to keep pen jitter small enough to permit writing more than four lines on a page. The second reason for poor writing quality was that they retained the induction galvanometers as pen positioning motors as previously used in Telautograph devices. The result was a unit with unuseable performance and at a price beyond the range for a single student.

It is common practice to record analog signals via frequency modulation on magnetic tape. However, to do so with fidelity, an instrument quality recorder/player is needed. Such recorders reduce wow and flutter to near zero as well as maintain the absolute speed to a fixed value, usually the same speed during playback as during recording. Such recorders are expensive and beyond the means of the average student.

It has been disclosed to record analog signals via pulse width modulation to secure the immunity to wow and flutter inherent in this modulation system. However, the system disclosed gives rise to jitter due to amplitude variations of the playback signal, has low frequency response due to the decoding means employed and generates large analog signal errors when a drop-out of the playback signal occurs.

SUMMARY OF THE INVENTION

The present invention is a combination of means to secure convenient inputing of a teacher's audio and written texts, and their subsequent remote playback and display with satisfactory fidelity and at a price level to be practical for an individual student.

It is a further object of this invention to provide a system easily used by a teacher in preparing the instructional material. Also a system that permits easy correction and updating of the text.

It is a further object of this invention to permit use of consumer quality, relatively low cost tape decks for playback.

It is a further object of this invention to provide a playback system that is portable by the student.

It is a further object of this invention to provide means for adding line graphics to dial access audio tape systems.

Magnetic tape recorders/players will have the problem of wow and flutter. This has reference to the fact that the magnetic tape is not moved past the record and playback heads at a constant speed. Wow refers to relatively low frequency speed variations due principally to mechanical inadequacies of the tape transport mechanism. Flutter refers to speed variations of higher frequencies due to the fact that the tape has elasticity and that there is friction between the tape and the head. This friction is characteristically a dry, rather than a viscous friction. Hence, at slow or zero relative speed between the tape and the head the friction is high and as the relative speed increases the friction decreases. The tape is pulled past the heads by a capstan and pinch-roll combination. Initially this pulling action elastically stretches the tape. The tape does not slide on the head until the stress in the tape is sufficient to overcome the relatively high static friction of the tape to head contact. Once sliding starts the friction drops to a relatively low value permitting a portion of the elastic strain in the tape to be released by contraction of the tape. During this period the tape speed past the head is increased, but as the contraction stops the relative speed of the tape past the head again decreases and the friction again increases and the cycle continuously repeats. In order to eliminate flutter the length of tape between the capstan and the heads must be reduced to essentially zero. High quality, high cost instrument recorders approach this ideal.

I have found that if I sample at a rate of one thousand times per second via pulse width modulation the effect of wow and flutter is reduced to an acceptable level. The reason for this result appears to be that there is little wow and flutter above approximately two hundred Hz. Assume for explanation purposes that wow and flutter amounted to 0.25% and was confined solely to the high end of it's frequency range; namely, two hundred Hz. In this case the average amplitude change in 0.001 second would be 0.25%×0.001/0.005=0.1%. However, the flutter approximates a sine wave and hence the change in amplitude during the 0.001 second sampling period will depend on which part of the sine wave is sampled. The worst case would be when the sine wave was passing thru zero where the rate of change of amplitude is pi times the average rate, increasing the effective flutter to 0.25%×3.1416=0.785%. And conversely, if the sine wave is sampled as it is reversing, the effective flutter is reduced to zero. The jitter in the worst case would be 0.785%×0.001/0.005=0.314%.

The above is further reduced by the nature of pulse width modulation. Each sample of the 1000 samples per second actually consists of two samples, the first part being the pulse and the second part being the no-pulse. The ratio of the time duration of these two parts being the pulse width modulation encoded information. Consider the case where these two parts are equal and the effect of a flutter wave being an essentially linearly varying velocity with time. The average of the velocity during the pulse portion would occure in the middle of the pulse period, likewise the average of the velocity during the no-pulse portion would occur in the middle of the no-pulse period. It follows then that this effect reduces the effect of flutter by onehalf for it is only the velocity change due to flutter between these two average points that effect the ratio and these two average points are 0.0005 second apart. Hence, the equation in the last sentence of the above paragraph is more correctly stated as; the worst case would be 0.785%×0.0005/0.005=0.156%. The pulse duration will vary from 15% to 85% of the 0.001 second sampling interval. The above logic holds thru this range of pulse width modulation.

In the above explanation the wow and flutter were assumed to occur solely at 200 Hz. whereas in actuality wow is generally composed of frequencies ranging from fractions to a few Hz. and the bulk of flutter is generally well below 200 Hz. Since the effect of flutter of a given amplitude is inversely proportional to it's frequency, then it follows that the above assumed case is more severe than in actuality.

Magnetic tape recorders/players all have the problem of variable amplitude of the playback signal. This appears to be due mainly to variations in the magnetic coating and in variations in the magnetic coupling of heat to tape. Past practice has been to directly record the pulse width modulation square wave and then detect the leading edge of the differentiated, playback pulse. This detection means does not detect the center of the pulse which corresponds to the leading and trailing edges of the pulse width modulation square wave, but rather detects a point in advance of the center of the pulse. And this detection point vaires with pulse amplitude, advancing with increased amplitude and retarding with decreased amplitude. This results in jitter of the decoded analog signal.

To eliminate this source of jitter I have found that differentiating the pulse width modulation square wave prior to recording produces a bipolar pulse on playback having a very high slew rate, central portion. This near vertical sweep portion of the pulse, as viewed on an oscilloscope, crosses zero at an instant corresponding to the leading and trailing edges of the pulse width modulation square wave and is independent of playback amplitude. Hence, amplitude variations do not affect the detection point and there is no jitter introduced by amplitude variations. Positive going transitions of the pulse width modulation square wave generate a bipolar pulse that is initially positive going and negative going transitions of the pulse width modulation square wave generate a bipolar pulse that is initially negative going. Hence, the polarity information of the pulse width modulation is retained.

Past practice has been to use a filter to retrieve the analog signal from the reconstructed pulse width modulation square wave. When a step change of the analog signal occurs the retrieved analog signal does not change to the new value immediately, but rather approaches the new value exponentially as the filter capacitor charges or discharges to the new analog voltage value. This requires many pulse width modulation sample periods to affect the step change, hence the frequency response of the system is too low to playback normal speed hand writing using consumer quality and speed magnetic tape recorders/players.

I completely integrate and derive the analog voltage from each pulse width modulation sample. Hence, when a step change of the input voltage occurs the derived analog voltage on playback will follow within one sample period. If the sampling rate is 1000 Hz., only one millisecond is required. The system frequency response for a sine wave is 83 Hz.

Magnetic tape recorders/players all have the problem of drop-outs. Past practice has been to ignore this problem. However, pulse width modulation is severly affected by drop-outs which cause large errors of the retrived analog voltage. For this reason I found it necessary to devise means to remove the effects of drop-outs. This was done by first detecting drop-outs by standard means using monostable flip-flops. Secondly by storing every other pulse width modulation data sample. The intervening samples are not used, but their time slot is used to provide time for a decision as to whether a drop-out had or had not occured and to accept or discard the sample data. This reduces the effective sampling rate to 500/second as far as system frequency response is concerned, but does not affect system immunity to wow and flutter.

In order for this invention to be acceptable and successful commercially it has to be small, portable and within the price reach of a large number of students. A small, low cost plotter adequate for this application is not commercially available. The uniquely designed plotter for this system is described in detail in the Description of Preferred Embodiment section.

DESCRIPTION OF DRAWINGS

FIG. 6 is a sectional view taken along line 6—6 in FIG 5.

FIG. 7 is an isometric view of the plotter stylus carriage.

FIG. 8 is an isometric view of the tracking means for stylus carriage x and y drive bars.

FIG. 13 shows the circuits for playback, decoding and regeneration of the pen position, analog voltages plus drop-out immunity means.

FIG. 14 shows the circuits for playback of the pen up-down signal and control of the plotter stylus power supply.

FIG. 15 shows the circuits for playback of the audio portion of the lesson material.

FIG. 22 delineates the specific circuits that must be activated during each of the four modes of system operation; namely, Record, Playback, Edit Audio and Edit Writing. And the circuit means required to provide this control.

DESCRIPTION OF PREFERRED EMBODIMENT

Figure 1:
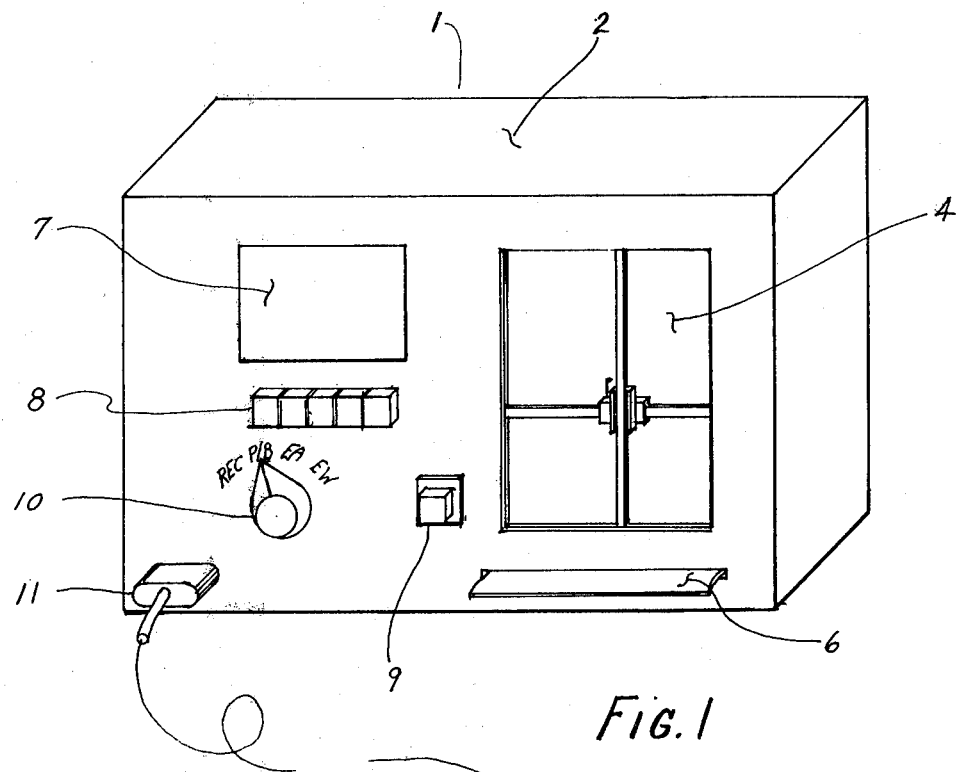
FIG. 1 is an oblique view of the lesson preparation unit.
Figure 2:
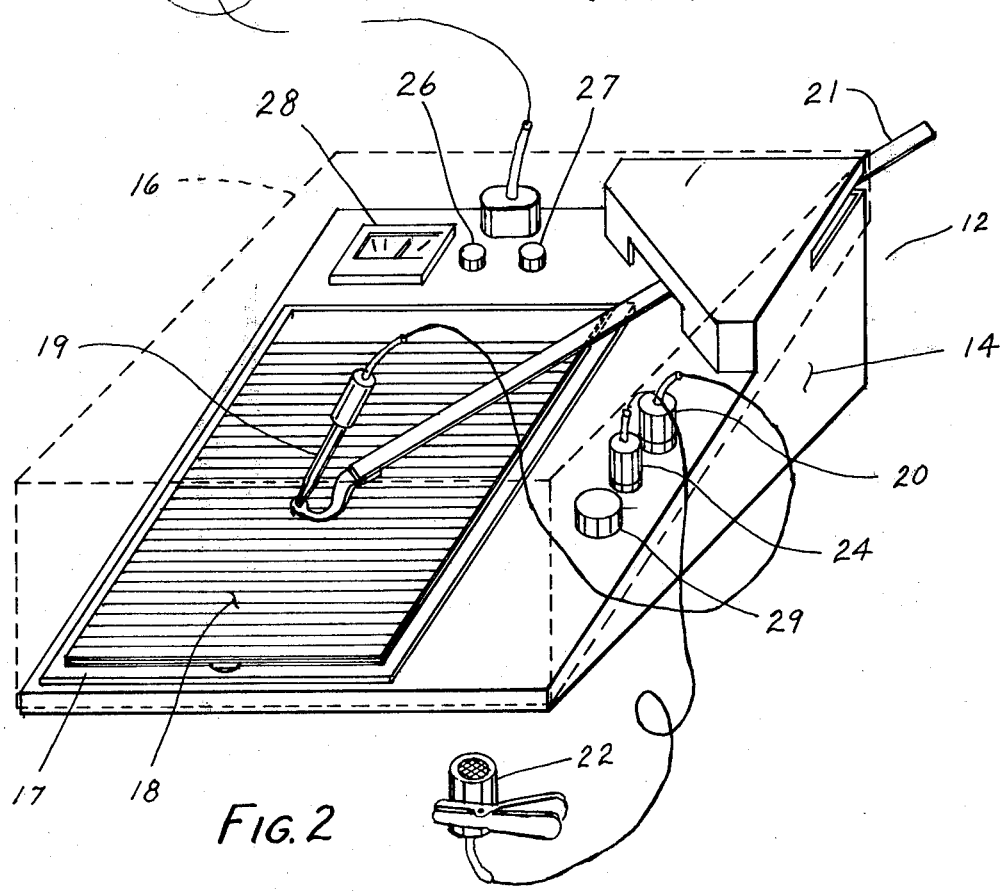
FIG. 2 is an oblique view of the input desk.

This invention consists preferably of three separate units: A lesson preparation console as shown in FIG. 1 for recording and editing. An input desk as shown in FIG. 2. And a student playback unit, not shown, but similar to the preparation console retaining only the tape transport, plotter and playback circuitry.

The preparation console 1, shown in FIG. 1, is enclosed in a housing 2. Mounted behind a window in the front face of housing 2 is an x-y plotter 4. The graphics drawn by the plotter on electrically sensitive paper 6 can be manually withdrawn bringing blank paper from a supply roll, not shown, into the plotter. The withdrawn portion of paper can be torn off against a tear edge, not shown, and the written text saved for reference. Recording magentic tape is inserted into a tape deck thru door 7. The tape transport is controlled by keyboard 8 which consists of five separate controls; namely, playback, record, fast-forward, reverse and door release. All power is controlled by on-off switch 9. The four operational modes; namely, record, playback, edit audio and edit writing are controlled by selector switch 10. Power is supplied to and information secured from the writing desk 12 via cable and connector plugs 11.

The input desk 12 is shown in FIG. 2 and is housed in and on a case 14. Case 14 is provided with a cover 16 for storage and transport. A frame 17 is provided to receive and hold a standard 8.5 × 11 inches writing pad of paper 18. Pen 19 is equipped with a switch that is actuated when the pen is pressed against the writing surface and is connected to relevant circuits via connector 20. Pen 19 is mechanically attached to arm 21. Arm 21 in turn actuates transducers used to generate analog voltages representative of the pen position. This is further delineated in FIG. 11. Microphone 22 is communicated with the record circuits via connector 24. Recording is initiated by pressing start record switch 26 providing mode selector switch 10 in FIG. 1 is in any mode other than playback. Recording is stopped by stop record switch 27. Audio record level is indicated by VU meter 28 and controlled via record level control 29.

Figure 3:
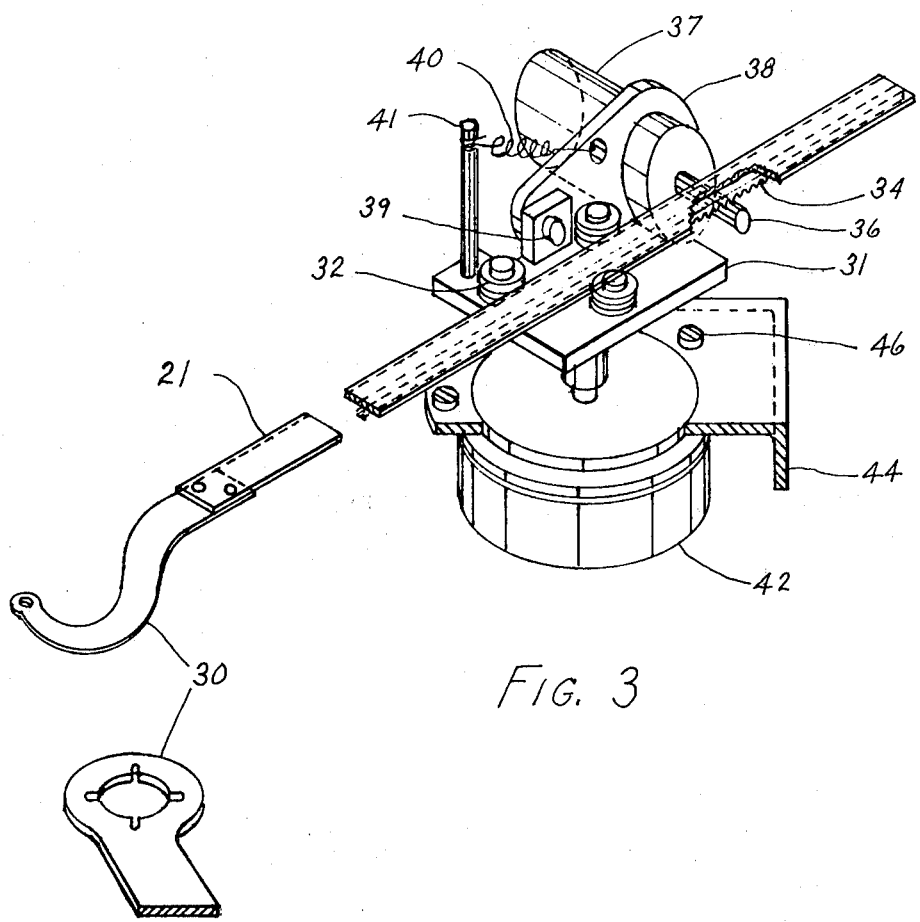
FIG. 3 is an isometric view of the mechanism that converts pen position into polar coordinate displacements of the transducers.

The means for tethering the pen and converting it's position into x-y coordinate, analog voltages is shown in FIG. 3. Part 30 is made of a resilient material such as plastic and has a hole at one end of a snap fit to the end of pen 19. The other end is attached to the end of arm 21. Arm 21 in turn is attached to part 31 such that arm 21 can move radially to and from the center of part 31 but cannot move angularly relative to part 31. This mounting is accomplished by three externally grooved ball bearings 32 mounted to part 31 and engaging the sides of arm 21; the three points of contact defining the corners of an isosceles triangle. On the underside of arm 21 is mounted a rack gear 34 that engages with gear 36 on the shaft of multi-turn potentiometer 37. Potentiometer 37 is carried by part 38 which in turn is mounted to part 31 via shoulder screw 39. Gear 36 is held in engagement with rack 34 by spring 40 which attaches to part 38 and post 41 which in turn is mounted to part 31. Part 31 is mounted to the shaft of sine-cosine potentiometer 42 via set screws, not shown. Sine-cosine potentiometer 42 is mounted to case 14 of FIG. 2 via bracket 44. The attachment of sine-cosine potentiometer 42 to bracket 44 is via three servo mounts 46 permitting sine-cosine potentiometer 42 to be adjusted for angular position.

Since radial movement of arm 21 causes solely rotation of potentiometer 37, and since rotary motion of arm 21 causes solely rotation of sine-cosine potentiometer 42, then it follows that the two potentiometers receive displacements that are the polar coordinates of pen 19. The circuitry for converting this polar coordinate information to rectilinear coordinate, analog voltages is detailed in FIG. 11 and will be described later.

Figure 4:
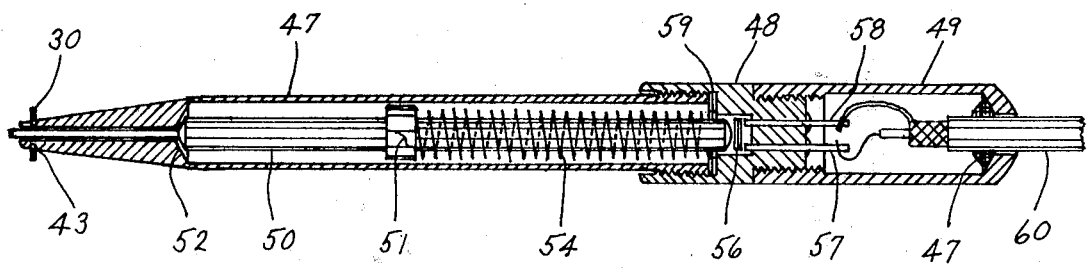
FIG. 4 is a cross-sectional view of the pen having an integral switch for sensing and signaling when it is actually writing.

The pen 19 in FIG. 2 is shown in cross-section in FIG. 4. It consists of a barrel 47 having a groove 43 very near the writing end and adapted to snap into the hole in the end of flexible part 30 in FIG. 3. Barrel 47 is thread connected to switch section 48 which in turn is thread connected to cap 49. A commercial ball-point pen cartridge 50 having a spring seat collar 51, fits into barrel 47 and is urged against seating surface 52 by compression spring 54. When the pen is pressed against the paper in the process of writing, the compressive force of spring 54 is overcome causing cartridge 50 to move to the right forcing laminated disc 56 to contact the ends of pins 57 and 58. Laminated disc 56 consists of an insulating layer bonded to a metal layer and oriented during assembly such that the metal layer contacts pins 57 and 58. The assembly of pins 57 and 58 and disc 56 functions as a normally open switch which closes when the pen is writing. Shim washers 59 are used to adjust the necessary travel of cartridge 50 to a few thousandths of an inch to close switch such that the lost motion is not noticeable to the writer. Cap 49 functions to support cable 60. During assembly a ring of silastic or epoxy cement is applied to the exterior surface of cable 60 at a longitudinal position such that when cap 49 is slid over cable 60 and screw connected to switch section 48, cap 49 contacts the cement.

Figure 5:
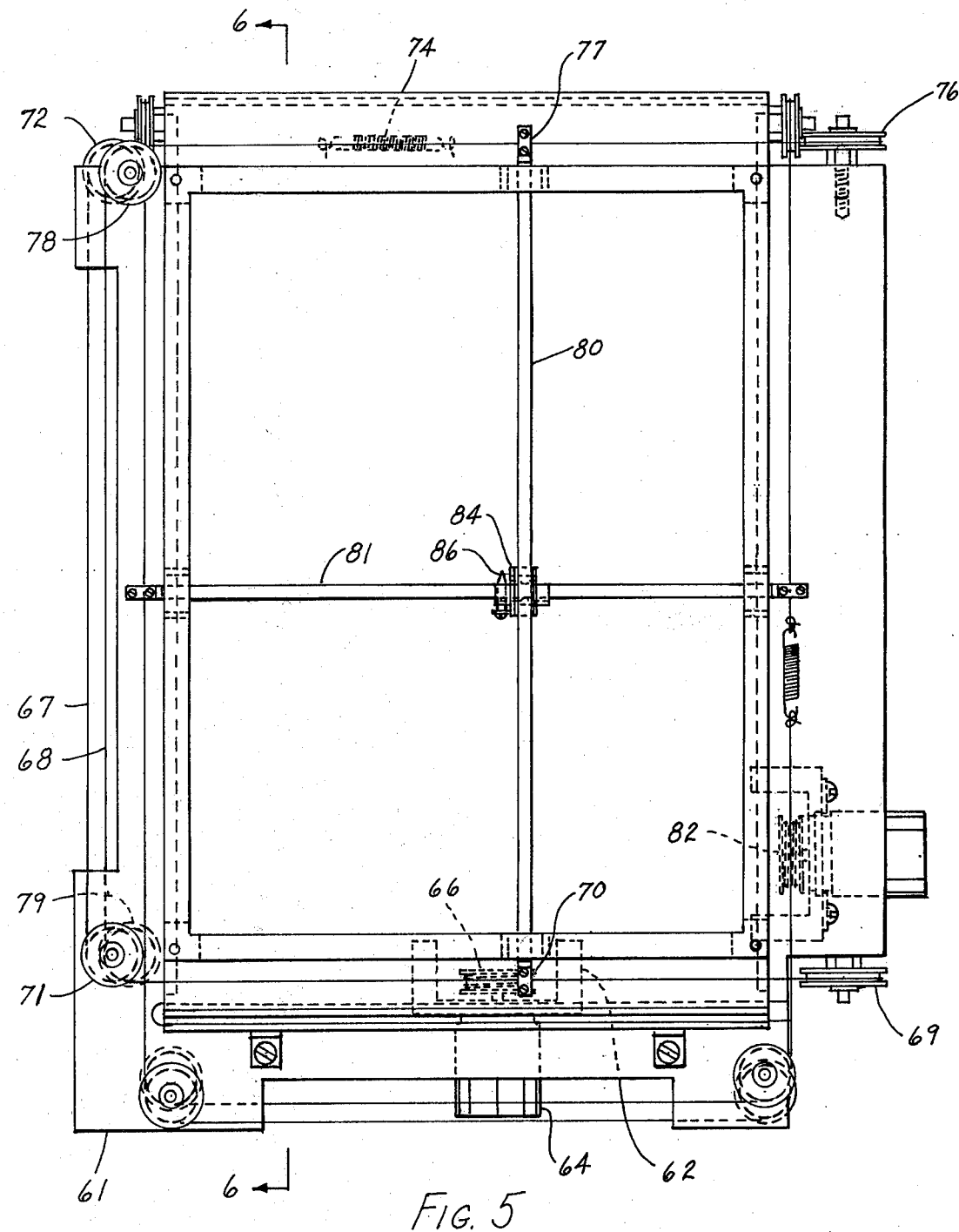
FIG. 5 is a front elevation view of the plotter for out-puting the graphic portion of the text.
Figure 9:
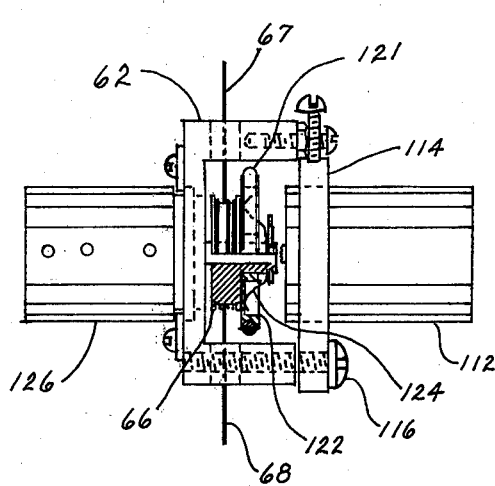
FIG. 9 is a view of the plotter drive and feed-back means as it would appear in a rear, vertical elevation view of the plotter.
Figure 10:
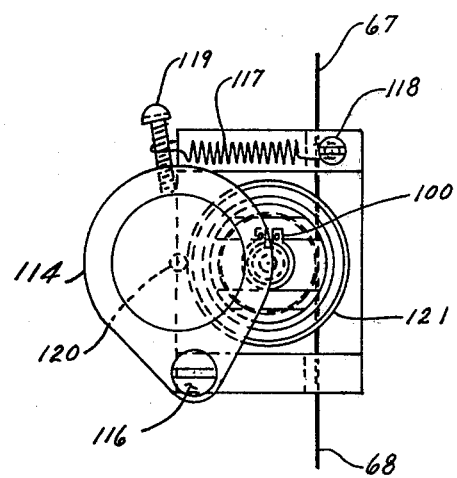
FIG. 10 is an end view of FIG. 9.

The x-y plotter is shown in FIG. 5 and functions to reproduce the writing and graphics the teacher typically displays on the blackboard. The plotter has as it's basic frame an aluminum plate 61. Mounted on the rear of frame 61 is a bracket 62 which in turn mounts feedback potentiometer 64. Attached to the shaft of potentiometer 64 is a cable pulley 66. This pulley is driven by a servo motor as shown in FIG. 9 and 10. Cables 67 and 68 are anchored to pulley 66 and each have a length of wrap-around on pulley 66 in excess of one-half the total x excursion of the plotter. Cable 67 runs to and around pulley 69 to x-bar anchor 70. Cable 67 then continues passing over pulleys 71 and 72 to spring 74 which functions to maintain a predetermined tension on the cables. Cable 68 attaches to the opposite end of spring 74, runs around pulley 76 to x-bar anchor 77 and then continues sequentially around pulleys 78 and 79 to pulley 66. This geometry causes x-bar 80 to move strictly in a translational manner without any rotational component in response to angular movement of pulley 66. Y-bar 81 is driven in a similar manner by pulley 82.

Carriage 84 is carried by bars 80 and 81 and always moves to the position corresponding to the coordinates to which the x-bar and y-bar are driven by the servo motors. Mounted on carriage 84 is an electrical stylus 86 consisting typically of a 0.005 to 0.010 inch diameter tungsten wire. This wire is bent back onto itself to produce a rounded point. This also provides rigidity to the point in the x-y plane, but flexibility normal to the x-y plane. This eliminates lost motion between the input drive and the actual writing, yet permits some tolerance in the spacing of carriage 84 and plate 61.

FIG. 6 is a sectional view taken along line 6—6 in FIG. 5. Mounted to the frame plate 61 is a bracket 87 which supports one end of the electrically sensitive paper supply roll 88. The paper 6 is threaded over the top and down the front face of plate 61 and is restrained in this path by front plate 89 and two side spacers 332. Spacers 332 are thicker than the paper and are spaced wider than the width of the paper such that the paper is free to slide vertically in this restrained path. Spacers 332 are also electrical insulators so that plate 61 can be maintained at one potential and plate 89 and all structures mounted forward of plate 89 can be maintained at a different potential. To preserve this electrical isolation the four bolts 332 are electrically isolated from plate 61 by four insulating shoulder washers 91. The purpose of this electrical isolation is to permit application of a voltage differential between the stylus and the paper support plate 61 as required to cause the stylus to mark the paper.

The paper is manually fed down the front surface of plate 61 by reaching thru the window in housing 2. When the leading edge of the paper reaches part 92, supported by angle brackets 94, it is deflected forward and can be grasped external to housing 2. Usually the paper is trimmed to an arrow shape to aid in threading. This leading edge portion is now trimmed off by tearing the paper against the forward, upper edge of part 92. When a page of graphics is completed and blank paper is desired in the plotter, the paper is grasped by the fingers against part 92 and pulled forward drawing blank paper from the supply roll 88 into the window area of the plotter and the completed graphics torn off and used for reference or discarded.

The frame 96 functions to provide guide slots for the x and y drive bars 80 and 81, respectively, and to space the plotter back from the rear surface of housing 2. The plotter is mounted to housing 2 via four bolts 90 and acorn nuts 97.

The carriage assembly and how it fits between the x and y bars 80 and 81, respectively, is shown in FIG. 7. The carriage 84 is forced to move in the x direction by the x-bar 80 bearing against surfaces 98 and 99. These surfaces also prevent rotation of the carriage about the z-axis. The carriage is forced to move in the y direction by y-bar 81 bearing against the edges of protuberances 100 and 101. The reason for having the narrow bearing surfaces on these two protuberances is to permit some misalignment between the x-bar and the y-bar by providing only a slightly greater spacing between the two driven edges than the width of the y-bar. Rotation of the carriage about the x-axis is prevented by surface 102. Rotation of the carriage about the y-axis is prevented by surface 104.

The stylus 86 is mounted to the carriage via plate 106 and cap screw 107. Electrical continuity is maintained between the carriage and the two drive bars thru the friction surfaces.

The details of guiding the drive bars 80 and 81 is shown in FIG. 8. Part 108 is attached to y-bar 81 via cap screws 109 clamping the drive cable 110 to bar 81. Part 108 extends between the front surface of part 89 and the rear surface of part 96 with sufficient clearance for a sliding fit. This restrains bar 81 from fore and aft motion and rotary motion about the longitudinal axis of bar 81. Surface 111 of part 108 in conjunction with it's compliment at the opposite end of bar 81 restrains bar 81 from longitudinal motion. Electrical continuity is maintained between the stationary surfaces and bar 81 thru part 108.

The plotter's servo motor drive system and position feed-back transducers are shown in FIGS. 9 and 10. The servo motor 112 is supported by bracket 114 which is pivot mounted to frame 62. This attachment is by capscrew 116 which threads both into bracket 114 and frame 62. In assembly capscrew 116 is screwed tightly into bracket 114 so that capscrew 116 and bracket 114 subsequently have no relative motion. Capscrew 116 is threaded into frame 62 leaving a space between bracket 114 and frame 62. Capscrew 116 then functions as a hinge pin for bracket 114 and servo motor 112. Tension spring 117 connected between capscrews 118 and 119 cause bracket 114 to pivot in a direction to bring output shaft 120 of servo motor 112 into contact with the circumference of O-ring 121. By this frictional engagement, wheel 122 is driven by servo motor 112 and in turn drives cable pulley 66 by frictional engagement between the sides of wheel 122 and cable pulley 66 due to the latter two being forced together by spring washer 124. The provision for slippage between wheel 122 and cable pulley 66 is to preclude stalling the servo motor when pen 19 is moved beyond the bounds of the writing pad 18. Rotation of cable pulley 66 imparts proportional translation to cables 67 and 68. Pulley 66 is set-screw connected to the shaft of multi-turn potentiometer 126 producing an output signal directly related to cable position, hence, stylus coordinate position. This signal is used to close the servo loop. Two such servo drive assemblies are bolted to the rear of frame plate 61 as shown in phantom in FIG. 5.

Figure 11:
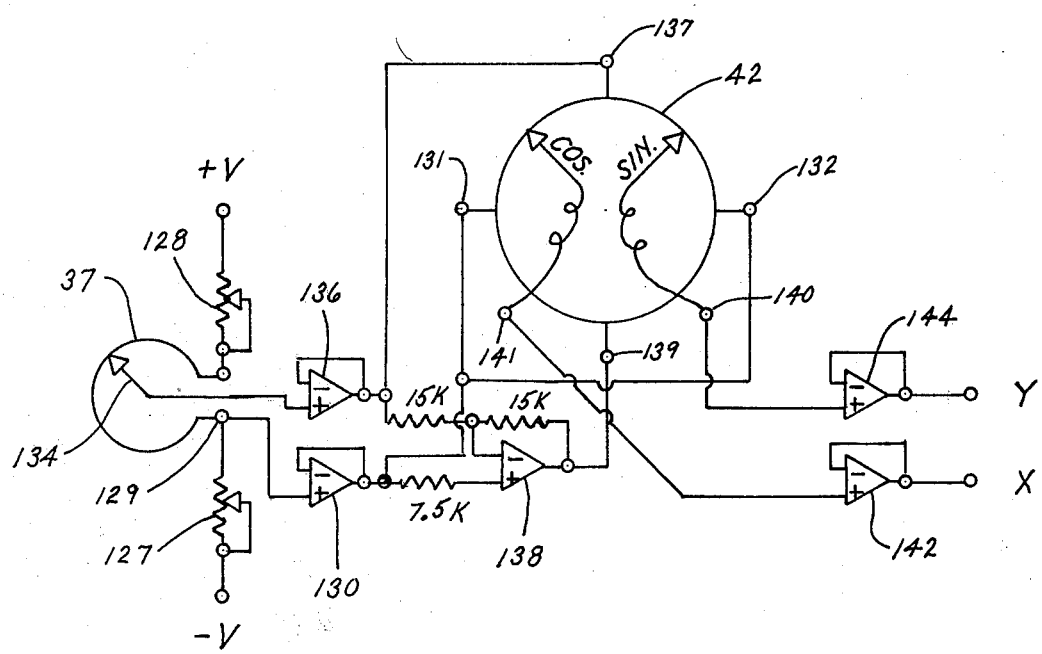
FIG. 11 shows the circuit used in conjunction with the input desk transducers for converting pen position to x-y coordinate, analog voltages.

FIG. 11 details the circuitry used to convert the polar coordinate information generated by the transducers and geometry of FIG. 3 into rectilinear coordinate, analog voltages. Potentiometers 127 and 128 function to adjust the voltage across the multi-turn potentiometer 37 to a level and magnitude required by the encoding circuits of FIG. 12. The voltage at point 129 represents zero polar distance to the pen position. This voltage is buffered by follower-connected amplifier 130 and connected to the "Ground" inputs of sine-cosine potentiometer terminals 131 and 132. The zero polar distance coincides with the axis of the sine-cosine potentiometer shaft. Since the pen cannot physically be moved to this position and the gear 36 of potentiometer 37 engaged with the rack 34 while the wiper of potentiometer 37 is at the terminal 129 end of it's travel, the following procedure is used to secure proper synchronization of potentiometer and pen positions. The potentiometer 37 is set with it's wiper at terminal 129 end of it's travel. Gear 36 of potentiometer 37 is engaged with rack 34 and the pen moved a radial distance away from the axis of sine-cosine potentiometer 42 a distance equal to the distance between the axis of sine-cosine potentiometer 42 and the upper, right-hand corner of the writing pad 18. Gear 36 is disengaged from rack 34, the pen 19 moved to the upper, right-hand corner of writing pad 18. The gear 36 and rack 34 are re-engaged taking care not to disturb the rotary position of potentiometer 37 in the process. As a consequence of this synchronization the voltage difference generated between point 129 and wiper 134 is proportional to the polar distance the pen 19 is from the origin. The voltage of wiper 134 is buffered by amplifier 136 and fed to the plus terminal 137 of sine-cosine potentiometer 42. The voltage impressed on sine-cosine potentiometer 42 between it's plus terminal and it's ground terminal is a voltage proportional to the pens polar displacement. This voltage is inverted by amplifier 138 with unity gain and fed to the negative terminal 139 of sine-cosine potentiometer 42 as required for proper functioning even though operation is confined to the 0 to 90 degree quadrant.

Sine-cosine potentiometer 42 is oriented angularly by rotation in it's mounting bracket 44 such that when tether arm 21 is parallel with the top edge of the writing pad 18, sine terminal 140 has the same voltage as terminal 132 and cosine terminal 141 has the same voltage as terminal 137, then locked in position by clamp screws 46. When the two transducers are so adjusted, the voltage between terminals 140 and 132 is proportional to the y coordinate distance of the pen from the x-axis. And the voltage between terminals 141 and 131 is proportional to the x coordinate distance of the pen from the y-axis. The origin of the coordinate axes being at the center of the sine-cosine potentiometer with the x-axis being parallel with the top edge of the writing pad 18. Amplifiers 142 and 144 buffer the x and y output analog voltages, respectively.

Figure 12:
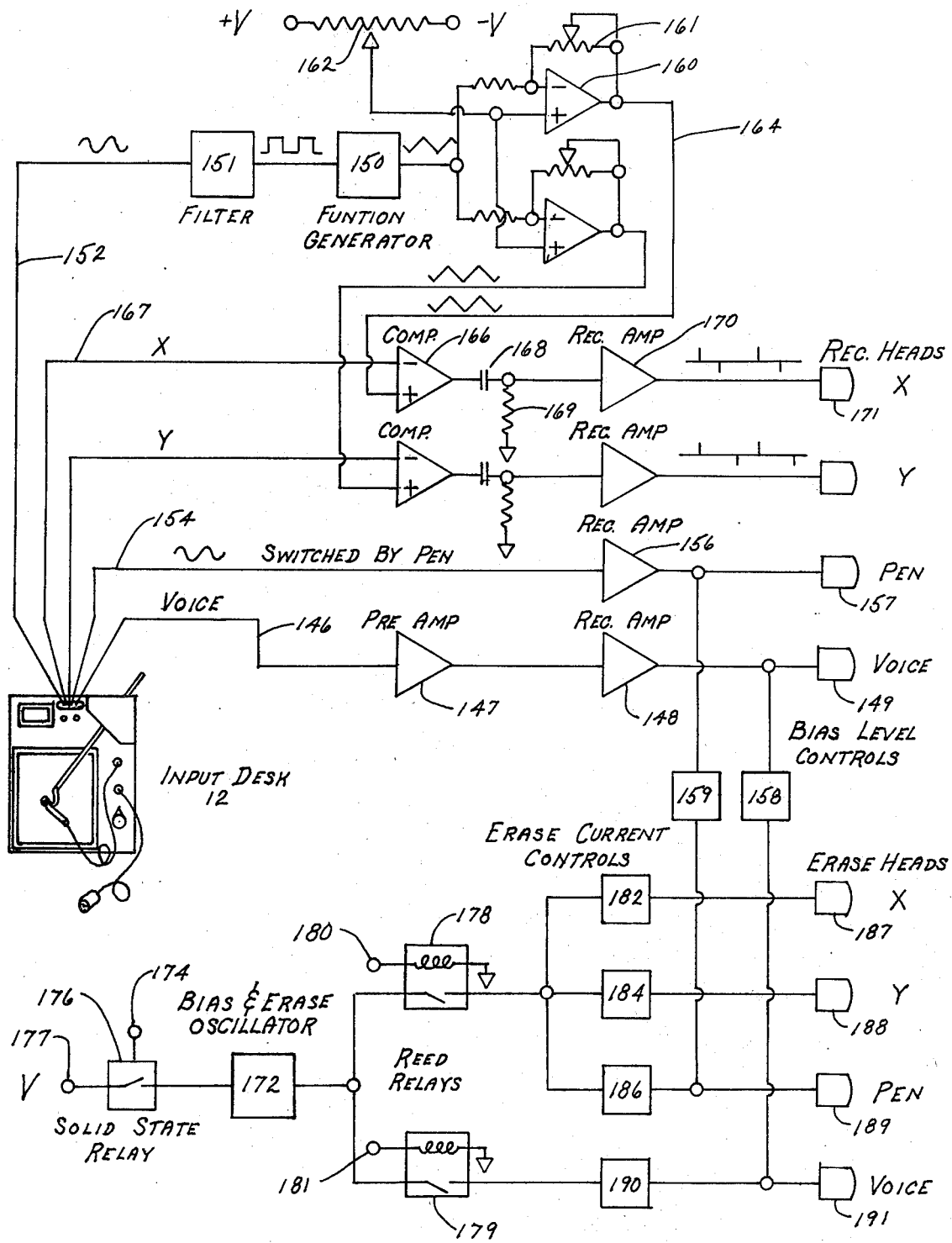
FIG. 12 shows the circuits for encoding and recording the lesson material.

FIG. 12 shows the circuits for receiving from the writing desk 12, the audio signals, the encoded pen up-down signsl and the pen x-y coordinate, analog voltages. The audio signals are communicated by line 146 to preamplifier 147 and thence thru record amplifier 148 to record head 149. The pen up-down signal originates from function generator 150 which outputs a square wave that is converted to a sine wave by filter 151 and communicated to the normally open switch in pen 19 via line 152. When the pen is pressed against the writing pad 18 the pen switch is forced closed communicating the sine wave to line 154. This 1000 Hz. signal is of sufficient amplitude to permit direct input into record amplifier 156 and thence to record head 157. Since both the voice and pen up-down signals are preferably recorded linearly, as contrasted to saturation recording of the x-y coordinate data, bias is required and is provided by bias level controls 158 for the audio and 159 for the pen up-down signal.

Function generator 150 also outputs a 1000 Hz. triangular wave which is buffered, amplified and level shifted by amplifier 160 in conjunction with gain control potentiometer 161 and reference voltage generator 162. This triangular wave is communicated via line 164 to comparitor 166 where it is compared to the x analog voltage communicated via line 167. While the triangular wave voltage is more positive than the x analog voltage, comparator 166 output is at or near the $+V$ supply voltage. When the triangular wave voltage changes to more negative than the x analog voltage the comparitor 166 output changes to near ground potential. The square wave thus generated is the pulse width modulation encoding of the x coordinate, analog voltage as will be further delineated in explanation of FIG. 16. This square wave is differentiated by the combination of capacitor 168 and resistor 169. On each positive-going excursion of the square wave, a narrow positive voltage spike is generated and conversely on each negative-going excursion of the square wave, a narrow negative voltage spike is generated. These voltage spikes are inputed to push-pull record amplifier 170 and thence to record head 171. The encoding, differentiation and recording of the y coordinate, analog voltages is the same as that delineated above for the x coordinate, analog voltage.

Erase oscillator 172 is actuated by application of a voltage to terminal 174 of solid state relay 176 which closes the circuit communicating the supply voltage at terminal 177 to erase oscillator 172. The output of erase oscillator 172 is communicated to relays 178 and 179, each controlled by the presence or absence of a voltage at terminals 180 and 181, respectively. When relay 178 is closed the output of oscillator 172 is communicated to erase current controllers 182, 184 and 186 which provide the proper erase currents to erase heads 187, 188 and 189, respectively. The x, y, and pen erase heads are connected in parallel from relay 178 because all three are common to the writing record function. The bias required for linear recording of the pen up-down, sine wave encoded signal is tekan from the output of erase current control 186 and further attenuated by bias level control 159 and thence to pen record head 157. When relay 179 is closed the output of oscillator 172 is communicated to erase current control 190 and thence to voice erase head 191 and also to bias level control 158 where the level is attenuated prior to reaching audio record head 149.

FIG. 13 delineates the circuitry that receives the playback signal of the twice differentiated pulse width modulation encoded x coordinate, analog voltage, reconstructs a duplicate of the original pulse width modulation square wave and demodulates the pulse width modulation encoded signal retrieving the original x coordinate, analog voltage. The signal from playback head 192 is amplified and linearized by pre-amplified 194, further increased in amplitude by amplifier 196 and centered at ground potential by AC coupling via capacitor 197 and clamped to ground via resistor 198. The time constant of the combination of capacitor 197 and resistor 198 being at least one second to preclude any detectable differentiation of the signal. The signal is then communicated with the inverting input of comparitor 199. The non-inverting input of comparitor 199 is connected to a voltage divider consisting of resistors 200 and 201. Resistor 200 is connected to a regulated +15 volt supply and resistor 201 is connected to the output terminal 202 of a 555 integrated circuit timer connected as a monostable oscillator 204. Hence, as long as monostable 204 is timed-out, resistor 201 is clamped to essentially ground potential. For the values shown in FIG. 13 the voltage fed to the non-inverting terminal of comparitor 199 is 0.96 volt. As long as the signal is below (more negative than) 0.96 volt the output of comparitor 199 will be high but when an initially positive-going signal, as shown, occures and rises above the comparison voltage of 0.96 volt the comparitor 199 output will drop to near zero. Because comparitor 199 output is connected to the trigger terminal of monostable 206, which triggers when the voltage at the trigger terminal drops below one third the positive voltage supply, monostable 206 triggers switching it's output 207 to the positive supply voltage causing the reference voltage supplied to the non-inverting terminal of comparitor 208 to change from 0.96 volt to +V (the positive power supply voltage). The playback signal is inverted by the inverting, unity gain amplifier 209 and centered at ground potential by capacitor 210 and grounding resistor 211, then communicated to the inverting terminal of comparitor 208. As a consequence, when the non-inverted signal returns to less than 0.96 volt and the output of comparitor 199 returns to essentially the +V output level, comparitor 208 is disabled from responding to the inverted signal rising above 0.96 volt because the reference voltage at the non-inverting terminal of comparitor 208 has been raised to the +V level. Hence, when an initially positive-going signal is played back, comparitor 199 will output a negative-going pulse which returns positive as the playback signal crosses zero (actually +0.96 volt) and the output of comparitor 208 will be undisturbed, remaining at the +V level. When an initially negative-going playback signal occures the inverse of the above sequence obtains resulting in a negative-going pulse at the output of comparitor 208.

The negative-going transition at the output of comparitor 199 passes thru capacitor 212 and diode 214 to ground. The positive-going transition, corresponding to the zero crossing of the playback signal, injects a positive-going spike thru diode 216 into inverting amplifier 217 generating a negative-going spike communicated to the set terminal of flip-flop 218 and the trigger terminal of monostable 219. When comparitor 208 outputs a pulse, capacitor 220, diodes 221 and 222 operate similarly generating a negative-going spike at the output of amplifier 224 that is communicated to the reset terminal of flip-flop 218 and trigger terminal of monostable 226. The repetition of the above sequence as the playback signals occur causes flip-flop 218 to alternately set and reset, generating the original pulse width modulation code at the Q output of flip-flop 218. The inverse of the pulse width modulation code is generated at the not-Q output of flip-flop 218 which is connected to the toggle terminal of flip-flop 227. Flip-flop 227 operates at one half the frequency of flip-flop 218 such that Q output of flip-flop 218 makes one complete cycle while Q output of flip-flop 227 is high, then Q output of flip-flop 218 makes it's next cycle while the Q output of flip-flop 227 is low.

The four outputs of the two flip-flops 218 and 227 are inputed to four, two-input nand gates such as to generate a sequence of four states. State One: When Q of flip-flop 218 and Q of flip-flop 227 are high, only nand gate 228 goes low. State Two: When not-Q of flip-flop 218 goes high and Q of flip-flop 227 remains high, only nand gate 229 output goes low. State Three: When Q of flip-flop 218 and not-Q of flip-flop 227 are high, only nand gate 230 output goes low. State Four: When not-Q of flip-flop 218 goes high and not-Q of flip-flop 227 stays high, only nand gate 231 output goes low.

The outputs of the nand gates are buffered and extended in voltage swing to +V and −V by amplifiers 232, 234, 236 and 237. Amplifiers 232, 236 and 237 are inverting amplifiers whereas amplifier 234 is non-inverting. The continuously repeating sequence of the four pulses are fed to the integrating and sampling circuitry to complete the demodulation of the pulse width modulation encoded, x coordinate, analog voltage.

Amplifier 238 has it's inverting input connected thru resistor 239 to a reference voltage generator by resistors 240, 241 and 242 connected as a voltage divider between the +V and −V supplies. Amplifier 238 has it's non-inverting input connected to the +V supply thru resistors 244 and 246. As a consequence the output of amplifier 238 will swing to it's maximum positive value. Field-effect transistor 247 (N-channel) will be conducting, hence, current can flow from the +V supply thru resistor 246 and transistor 247 to capacitor 248. The magnitude of this current is limited to a value that will generate an IR voltage-drop in resistor 246 equal to the IR voltage-drop in resistor 240. If the current attempts to deviate from this value the output of amplifier 238 will change as required to control the current by changing the voltage on the gate of transistor 247 and thus the effective resistance of transistor 247. This constant, positive current will charge capacitor 248 at a constant rate (dv/dt). This current will exist, however, only during State One when the output of amplifier 232 is high and isolated from the non-inverting input of amplifier 238 by diode 249. When amplifier 232 is low, during the other three states, the non-inverting input of amplifier 238 is held at essentially −V causing the output of amplifier 238 to be at essentially −V which completely pinches-off field-effect transistor 247 resulting in zero positive current flow to capacitor 248.

The negative, constant current supply consists of amplifier 250, field-effect transistor 251 (P-channel) and resistors 252, 254 and 256 functions similarly to the positive current supply except for polarity reversal. During State Two when the output of amplifier 234 is low and isolated from the non-inverting terminal of amplifier 250 by diode 243, current is drawn from capacitor 248. During the other three states, when the output of amplifier 234 is high, amplifier 250 is driven into saturation with it's output high, pinching-off field-effect transistor 251 resulting in zero negative current.

During State Three when the output of amplifier 236 is high turning on field-effect transistor 257 (N-channel), capacitor 258, which is at least an order of magnitude smaller than capacitor 248, is allowed to equalize and assume essentially the voltage of capacitor 248. Amplifier 259 is connected as a voltage follower, buffering capacitor 258 from the x coordinate, analog output at terminal 260.

During State Four when the output of amplifier 237 is high turning on field-effect transistor 261 (N-channel), capacitor 248 is discharged to ground potential in preparation for the next integration cycle.

As long as the playback signals are continuous the system so far described reproduces the x coordinate, analog voltage with fidelity. When a drop-out of the playback signal occurs the output at terminal 260 can momentarily be erroneous because either the positive, constant current source or the negative, constant current source was permitted to operate too long. Refer back to inverting amplifier 217 which outputs a negative-going spike at a rate of 1000 Hz. and is connected to the trigger terminal of re-setable monostable 219. Monostable 219 is adjusted to have a time-out period just slightly longer than the time period between reset spikes from amplifier 217, typically 0.00105 second. Hence, as long as the initially positive-going playback signals are received without miss, monostable 219 will never time-out. Amplifier 224 in conjunction with monostable 226 operates in a similar manner for the initially negative-going playback signals. If either monostable 219 or 226 times-out due to a missing playback signal, it's respective output terminal will go low. This will cause the voltage at the set terminal of flip-flop 262, normally held high via resistor 264 connected to +V, to go low setting flip-flop 262. Not-Q will go low holding one input to nand gate 230 low preventing the generation of a State Three signal and hence disables the sampling of a possible erroneous voltage on capacitor 248. Resistor 266 functions solely to permit flip-flop 262 to over-ride flip=flop 218 in control of nand gate 230. Flip-flop 262 will remain set until State Four occures causing the output of nand gate 231 to go low resetting flip-flop 262.

The playback circuitry for the y coordinate, analog voltage, including immunity to drop=outs, is identical to that described above for the x coordinate data.

FIG. 14 shows the circuitry for playback of the encoded pen up-down signal and means for controlling the energy to the plotter stylus. The playback signal generated by playback head 267 is amplified and linearized by amplifier 268 and further increased in amplitude by amplifier 269. Capacitor 270 in conjunction with diode 271 connected to ground and diode 272 form a half-wave rectifier that charges filter capacitor 274 to a positive voltage sufficient to close solid state relay 276. Relay 276 is connected between the stylus energy source and the stylus on the plotter.

FIG. 15 shows the circuitry for playback of the audio and means for squelching the audio playback during audio recording. The playback signal generated by playback head 277 is amplified and compensated by pre-amplifier 278 and further amplified by amplifier 279. Potentiometer 280 in conjunction with resistor 281 control the gain of amplifier 279 and hence functions as the volume control. Field-effect transistor 282 functions to reduce the gain to near zero when recording audio by providing a low resistance in parallel with feed-back potentiometer 280. Amplifier 284 is a power amplifier for driving a speaker or earphones 286.

Figure 16:
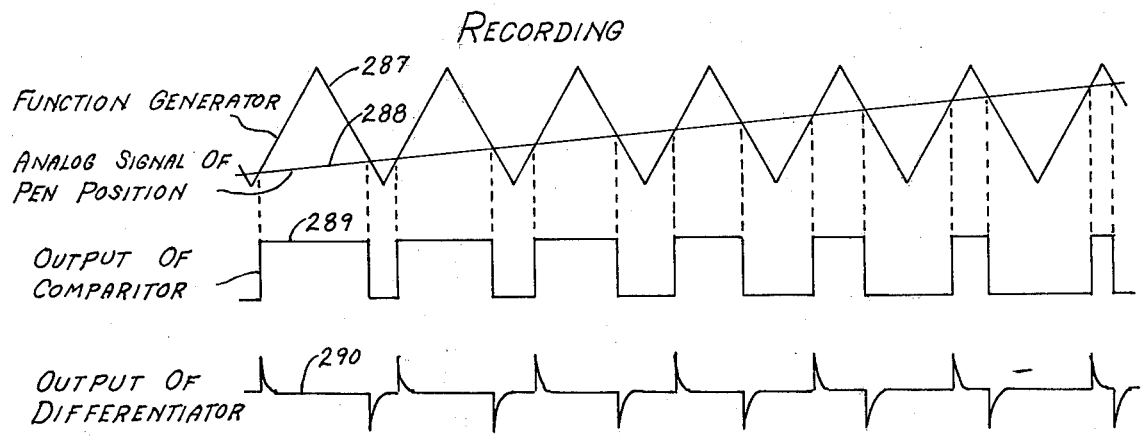
FIG. 16 shows the wave forms generated in the process of encoding and recording of the pen position, analog voltages.

FIG. 16 shows the wave forms involved in the pulse width modulation encoding of the coordinate, analog voltages. Triangular wave 287 from function generator 150 (FIG. 12) is amplified sufficiently to have an amplitude 1.43 times the maximum excursion of the y coordinate, analog voltage (y having a larger excursion than x for an 8.5×11 format) and level shifted to center on the mean value of the y analog voltage 288. Waves 287 and 288 when fed to a voltage comparator generate the pulse width modulation 289 encoding of the analog voltage. This pulse width modulation wave is differentiated prior to recording and appears as wave 290.

Figure 17:
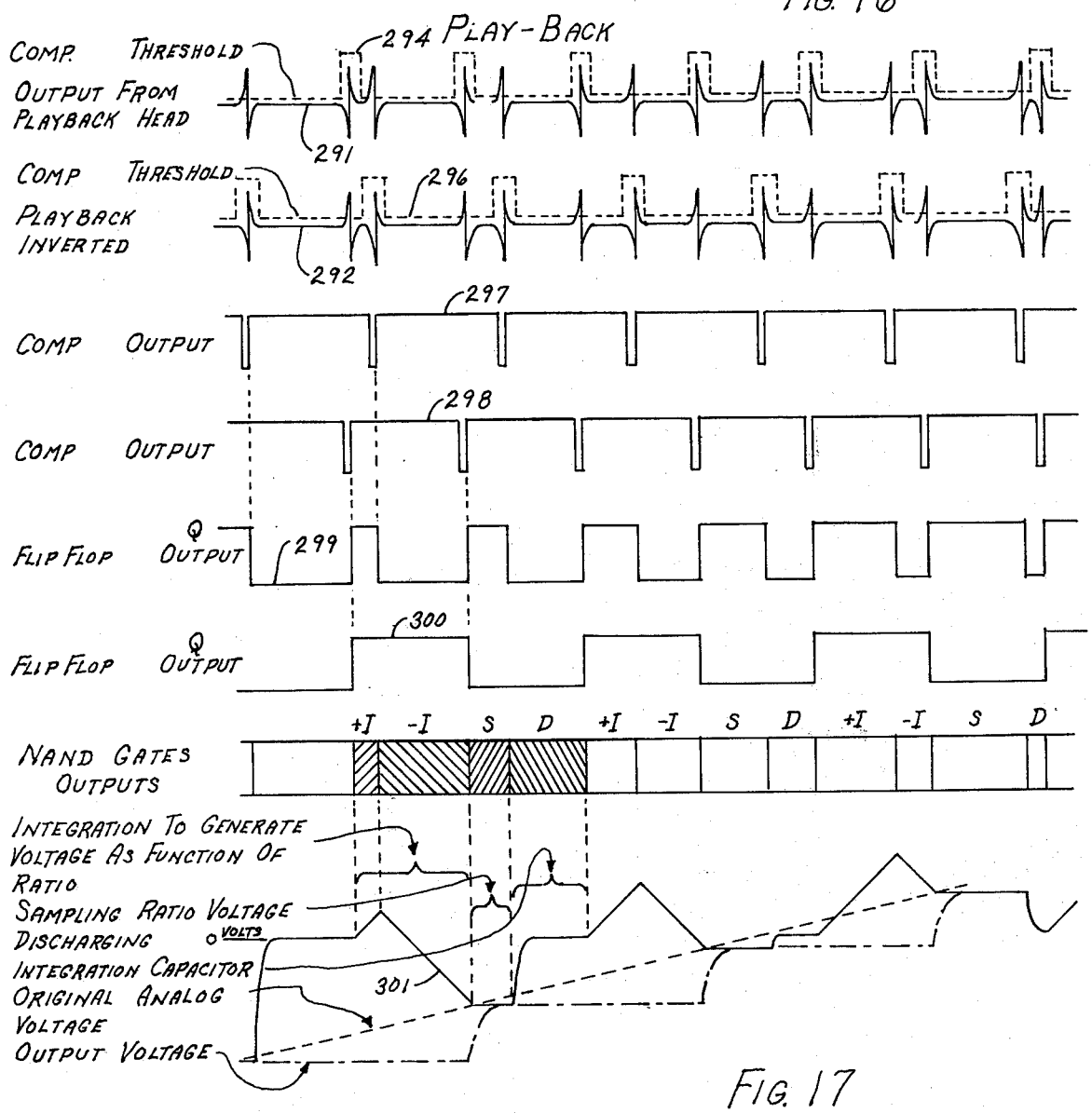
FIG. 17 shows the wave forms generated in the playback and decoding of the pen position, analog voltages.

FIG. 17 shows the wave forms involved in playback of the pen position, coordinate data, regeneration of the pulse width modulation and demodulation to retrieve the original pen position coordinate, analog voltages. The recorded signal is differentiated by the playback head and appears as wave 291. This signal is also inverted, appearing as wave 292. Wave 291 is compared with a reference voltage, shown as a dotted line 294, and wave 292 is compared with a reference voltage, shown as dotted line 296. Note that wave 291 is initially positive-going, whereas wave 292 is initially negative-going. As a consequence, the comparitor of wave 291 and it's reference 294 is the first to output a pulse shown as wave 297. The negative-going edge of this pulse is used to trigger a monostable whose output causes reference voltage 296 to rise to +V. Hence, the positive portion of wave 292 can not reach the reference voltage 296 and as a consequence it's associated comparitor output, wave 298, does not output a pulse. The reverse occures when wave 292 is initially positive-going, resulting in wave 298 having a negative-going pulse.

The positive-going edge of wave 297 is used to set a flip-flop and the positive-going edge of wave 298 is used to reset the same flip-flop, generating wave 299. The negative-going edge of wave 299 is used to toggle a flip-flop generating wave 300.

Waves 299 and 300 when combined together have four unique states. State One: 299 high and 300 high. State Two: 299 low and 300 high. State Three: 299 high and 300 low. State Four: 299 low and 300 low.

State One is used to feed a constant, positive current into a capacitor. State Two feeds an equal but opposite constant current into the same capacitor. The final voltage of the capacitor is the re-created coordinate, analog voltage. During State Three this voltage is sampled by a sample and hold circuit for outputing to the plotter. During State Four the integration capacitor is discharged to a fixed value, typically zero, ready for the next cycle. The voltage wave form on the capacitor is shown as wave 301.

Figure 18:
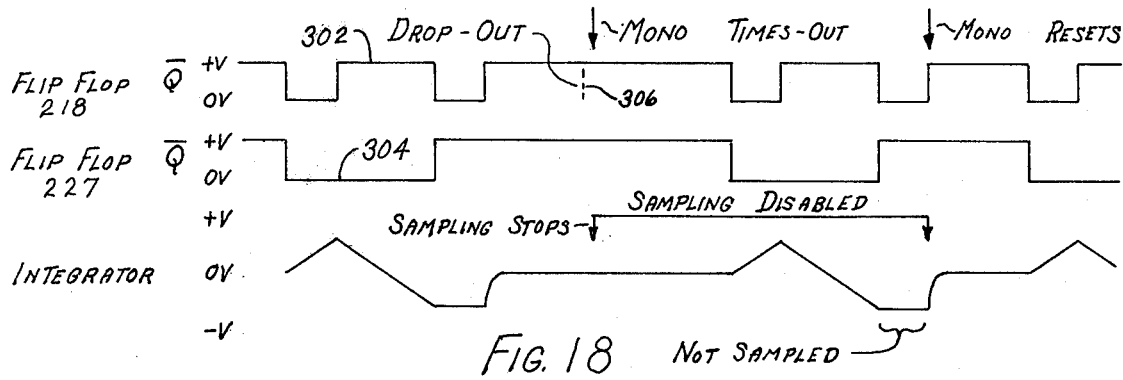
FIGS. 18, 19, 20 and 21 show the consequences of a drop-out in each of the four possible instances of occurrance, relative to the decoding and sampling cycle.

FIGS. 18, 19, 20 and 21 show the sequence of events when a drop-out of the playback signal occures. FIG. 18 covers the case where the drop-out occures at the instant the two flip-flops would normally switch from State Four to State One. Wave 302 is the output of the set-reset flip-flop and wave 304 is the output of the toggling, slave flip-flop. The drop-out is shown as the dotted line 306 on wave 302. The only consequence to the integration, sampling and discharge sequence is that the next complete cycle is delayed in starting for 0.001 second and the sampling during this delayed cycle is disabled, causing the loss of one good sample.

Figure 19:
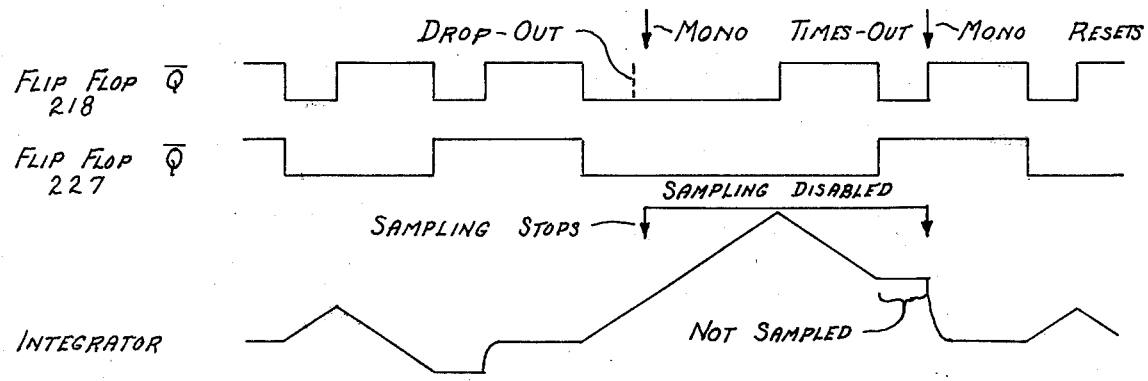

FIG. 19 covers the case where the drop-out occures at the end of State One. The consequence of this is that the switching from State One to State Two is delayed for 0.001 second or longer during which time the positive, constant current continues to be fed to the integration capacitor. This subsequently results in an erroneous regeneration of the coordinate, an analog voltage. However, since the sampling is disabled commencing approximately 0.00005 second after the drop-out until State Four is reached, the erroneous voltage is not sampled and the previous voltage in the sample and hold capacitor is continued to be fed to the plotter.

Figure 20:
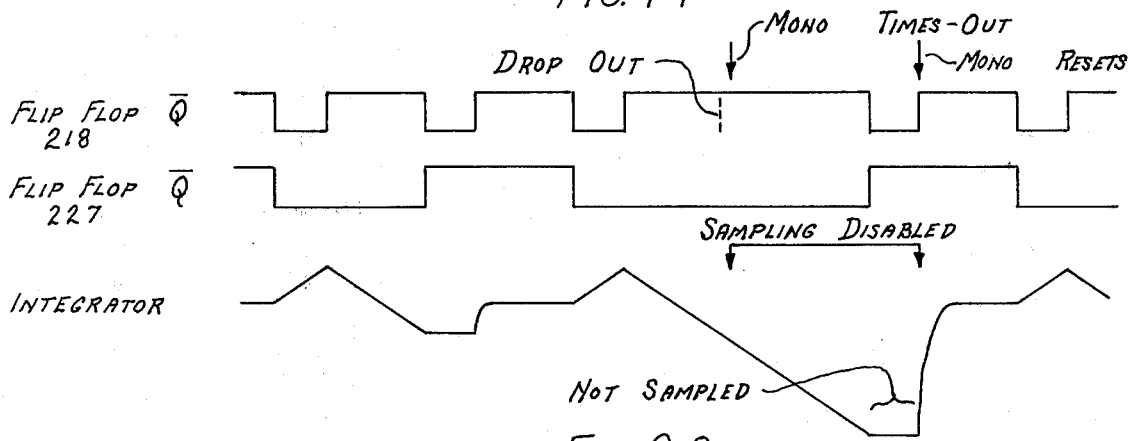

FIG. 20 covers the case where the drop=out occurs at the end of State Two. The consequence of this is that the switching from State Two to State Three is delayed 0.001 second during which time the negative, constant current continues to be fed to the integration capacitor. This subsequently results in an erroneous regeneration of the coordinate, analog voltage. However, since the sampling gate is disabled approximately 0.00005 second after the instant State Two would normally have been ended and until State Four occurs, the erroneous voltage is not sampled and the voltage from the previous cycle is continued to be fed to the plotter.

Figure 21:
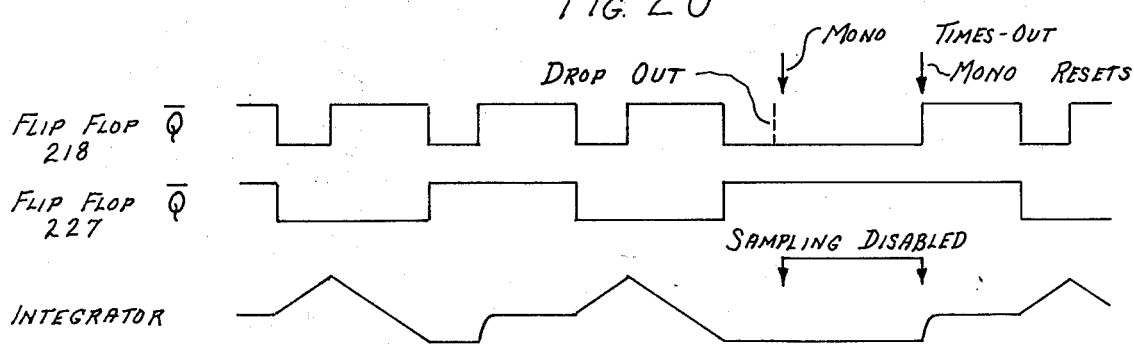

FIG. 21 covers the case where the drop-out occurs at the end of State Three. The consequences in this case are nil except that an extra 0.001 second delay occurs before State Four is reached. The sample gate is disabled subsequent to sampling so no data is lost.

The lesson preparation equipment of input desk 14, FIG. 2, and record monitor unit 1, FIG. 1, has four modes of operation as shown in FIG. 22: (1) Record (Rec) where both the writing and audio pre-existing on the tape are erased and new writing and audio are recorded. (2) Playback (P/B) where there is no erasing but both the writing and the audio are played back. (3) Edit Audio (EA) where the writing is played back but the audio is erased and new audio is recorded. And (4) Edit Writing (EW) where the audio is played back but the writing is erased and new writing recorded.

The various functional elements are separately listed for the record functions and the playback functions. The modes when each functional element must be energized are collaterally listed. The circuitry for effecting these required energizations is shown except for those elements which need be energized during all modes and are consequently directly connected to their required power supplies. It is to be noted that only three combinations are required and are identical for both the +V and −V power supplies. It is to be further noted that these combinations are limited to those functional elements involved in recording. For this reason each of the three combinations must be under the control of the Start Record Switch 26 and Stop Record Switch 27, FIG. 2.

When Start Record Switch 26 is momentarily closed, −V is communicated to the slider bar 307 of the negative pole of double pole, four position, selector switch 10. When selector switch 10 is in mode 1 or 3 or 4 position, −V is communicated thru diode 308 or 309 or 310, respectively, to relay 311, causing it's two contacts 312 and 314 to close. Contacts 312 function to hold relay 311 energized after switch 26 opens and also to supply −V to selector switch 10 thru contact 27. Contact 314 supplies +V to selector switch 10.

In mode 1, −V is connected to terminals 316, 317 and 318 thru diodes 308, 319 and 320, respectively. And +V is connected to terminals 321, 322 and 324 thru diodes 326, 327 and 328, respectively. In mode 2 no record circuits are energized. In mode 3 −V is connected to terminals 316 and 318 thru diodes 309 and 326, respectively. And +V is connected to terminals 321 and 324 thru diodes 327 and 323, respectively. In mode 4 −V is connected to terminals 316 and 317 thru diodes 310 and 329, respectively. And +V is connected to terminals 321 and 322 thru diodes 330 and 331, respectively. When normally closed Stop Record Switch 27 is momentarily opened, relay 311 opens and remains open removing power from all record circuits.

I claim:

1. A system for recording and subsequent playback of the audio and graphic presentation of a classroom, teaching experience comprising;

a microphone for inputing the audio text, a writing desk with a writing instrument connected to displacement transducers for inputing writing instrument coordinate position information, a writing instrument incorporating a switch means capable of signaling writing instrument contact with the writing surface, an oscillator connected to the writing instrument switch means, means for pulse width modulation encoding of the writing instrument coordinate analog signals, means for differentiation of the pulse width modulation encoded analog signals, record circuits for recording the audio, the writing instrument switched tone signals and the differentiated pulse width modulation encoded writing instrument coordinate analog signals, four record/playback head channels, four erase head channels, a tape transport, a playback circuit for the audio text, a playback circuit for the writing instrument controlled tone signal plus rectifier and integrating capacitor driving a solid state relay which controls the writing means of the plotter, means for decoding the twice differentiated pulse width modulation encoded writing instrument coordinate analog signals, a plotter for receiving the decoded writing instrument coordinate analog signals plus the electrical writing control from the solid state relay and reproducing the graphic portion of the text, an audio transducer for reproducing the audio portion of the text, switching means for controling the record and reproduction functions.

2. The system of claim 1, wherein the pulse width modulation encoding means utilizes a linear slope, triangular wave generator.

3. The system of claim 1, wherein the differentiated pulse width modulation encoded analog signals are recorded without bias.

4. The system of claim 1, wherein the pulse width modulation decoding means detect the essential center of the bipolar pulse generated on playback.

5. The system of claim 1, wherein the polarity of the original pulse width modulation is recovered during the decoding process.

6. The system of claim 1, wherein the writing instrument coordinate, analog signal is recovered from each pulse width modulation sample used.

7. The system of claim 1, further comprising means for detecting the occurance of a signal drop=out and retaining the last valid analog signal until the next valid analog signal is obtained.

8. The system of claim 1, further comprising a plotter that utilizes electrically sensitive paper and the electrical drive of the marking stylus is controlled by the solid state relay.

9. The system of claim 1, further comprising a plotter driven by direct current, iron-less rotor servo motors.

10. The system of claim 1, further comprising direct connected, position feed-back potentiometers and differentiation of feed-back signal voltage for servo dampening.

11. The system of claim 1, further comprising a friction drive between the servo motors and the driven components of the plotter.

12. The system of claim 1, further comprising a slip clutch in the drive system of the plotter.

13. The system of claim 1, further comprising a manual feed of plotter paper from a storage roll supply and a tear edge whereby the completed graphics can be selectively removed and used for reference or discarded.

14. The system of claim 1, wherein the control provides for recording of writing and audio, playback of writing and audio, playback of audio and recording of writing, and playback of writing and recording of audio.

15. The system of claim 1, further comprising means for monitoring the writing as the writing is being recorded.

16. The system of claim 1, further comprising means for monitoring the writing as the audio is being edited.

17. The system of claim 1, further comprising means for monitoring the audio as the writing is being edited.

* * * * *